(12) United States Patent
Lev et al.

(10) Patent No.: US 11,676,270 B2
(45) Date of Patent: Jun. 13, 2023

(54) MEASUREMENT OF BODY TEMPERATURE OF A SUBJECT

(71) Applicant: NEC Corporation Of America, Herzlia (IL)

(72) Inventors: Tsvi Lev, Tel-Aviv (IL); Yaacov Hoch, Ramat-Gan (IL); Liran Orevi, Rishon-LeZion (IL)

(73) Assignee: NEC Corporation Of America, Herzlia (IL)

( * ) Notice: Subject to any disclaimer, the term of this patent is extended or adjusted under 35 U.S.C. 154(b) by 387 days.

(21) Appl. No.: 17/006,944

(22) Filed: Aug. 31, 2020

(65) Prior Publication Data
US 2022/0067921 A1   Mar. 3, 2022

(51) Int. Cl.
| | |
|---|---|
| G06T 7/00 | (2017.01) |
| G06T 7/174 | (2017.01) |
| G01J 5/00 | (2022.01) |
| G10L 25/51 | (2013.01) |
| G06V 40/16 | (2022.01) |
| G06F 18/214 | (2023.01) |
| G01J 5/48 | (2022.01) |

(52) U.S. Cl.
CPC .......... *G06T 7/0012* (2013.01); *G01J 5/0003* (2013.01); *G06F 18/214* (2023.01); *G06T 7/174* (2017.01); *G06V 40/166* (2022.01); *G06V 40/171* (2022.01); *G10L 25/51* (2013.01); *G01J 5/48* (2013.01); *G01J 2005/0077* (2013.01); *G06T 2207/10016* (2013.01); *G06T 2207/10024* (2013.01); *G06T 2207/10048* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 2009/0105605 A1* | 4/2009 | Abreu | A61B 5/4076 600/549 |
| 2016/0278670 A1* | 9/2016 | Schoettker | A61B 5/1116 |
| 2017/0039440 A1* | 2/2017 | Li | G10L 15/04 |
| 2020/0175255 A1* | 6/2020 | Kücükcayir | G06V 40/172 |

FOREIGN PATENT DOCUMENTS

| | | | |
|---|---|---|---|
| CN | 111174919 A | * | 5/2020 |
| JP | 2011067371 A | * | 4/2011 |

OTHER PUBLICATIONS

Baek, Seung-Won, et al. "Relationship between tongue temperature estimated by infrared thermography, tongue color, and cold-heat pathological patterns: a retrospective chart review study." Evidence-Based Complementary and Alternative Medicine 2018 (2018). (Year: 2018).*

* cited by examiner

*Primary Examiner* — Sean M Conner

(57) ABSTRACT

There is provided a computer implemented method of measuring a temperature of a subject, comprising: receiving a sequence of a plurality of thermal images of a subject captured by a thermal sensor, analyzing the sequence of the plurality of thermal images to identify at least one target thermal image depicting an upper region of a tongue of the subject, analyzing the at least one target thermal image to identify an estimated temperature of the upper region of the tongue, and providing the estimated temperature of the upper region of the tongue.

21 Claims, 9 Drawing Sheets

MEASUREMENT OF BODY TEMPERATURE OF A SUBJECT

FIELD AND BACKGROUND OF THE INVENTION

The present invention, in some embodiments thereof, relates to measurement of temperature of a body of a subject and, more specifically, but not exclusively, to a device and method for non-contact measurement of body temperature of a subject.

Different approaches have been developed to measure body temperature of a subject. Traditional methods involve using a thermometer with a contact sensor that is placed against the body of the person, for example, within the mouth, or underneath an axilla of the person. Although such approaches are considered accurate, they are not practical in many situations, due to the long amount of time it takes to obtain such a reading and/or due to spread of infection that may occur if one thermometer used on one person is then used on another person and/or due to use of dangerous substances (i.e., mercury) is some implementations. Other approaches are non-contact thermometers, for measuring temperature within the ear and/or on the forehead. However, the temperature measured in locations such as the ear and/or forehead is not necessarily accurate and/or not reflecting of the real body temperature of the subject.

SUMMARY OF THE INVENTION

According to a first aspect, a computer implemented method of measuring a temperature of a subject, comprises: receiving a sequence of a plurality of thermal images of a subject captured by a thermal sensor, analyzing the sequence of the plurality of thermal images to identify at least one target thermal image depicting an upper region of a tongue of the subject, analyzing the at least one target thermal image to identify an estimated temperature of the upper region of the tongue, and providing the estimated temperature of the upper region of the tongue.

According to a second aspect, a system for measuring a temperature of a subject, comprises: at least one hardware processor executing a code for: receiving a sequence of a plurality of thermal images of a subject captured by a thermal sensor, analyzing the sequence of the plurality of thermal images to identify at least one target thermal image depicting an upper region of a tongue of the subject, analyzing the at least one target thermal image to identify an estimated temperature of the upper region of the tongue, and providing the estimated temperature of the upper region of the tongue.

According to a third aspect, a computer program product for measuring a temperature of a subject, comprises: a non-transitory memory having stored thereon a code for executing by at least one hardware processor, comprising instructions for: receiving a sequence of a plurality of thermal images of a subject captured by a thermal sensor, analyzing the sequence of the plurality of thermal images to identify at least one target thermal image depicting an upper region of a tongue of the subject, analyzing the at least one target thermal image to identify an estimated temperature of the upper region of the tongue, and providing the estimated temperature of the upper region of the tongue.

In a further implementation form of the first, second, and third aspects, the at least one target thermal image comprises a sequence of a plurality of target thermal images depicting the upper region of the tongue, wherein analyzing the at least one target thermal image comprises analyzing a pattern of the estimated temperature of the upper region of the tongue in each of the plurality of target thermal images to identify a maximal value of the estimated temperature of the upper region of the tongue of the pattern, wherein providing the estimated temperature of the upper region of the tongue comprises providing the maximal value of the estimated temperature of the upper region of the tongue.

In a further implementation form of the first, second, and third aspects, analyzing the sequence comprises: analyzing the sequence to identify the at least one thermal image according to a maximal opening of the mouth.

In a further implementation form of the first, second, and third aspects, further comprising: analyzing at least one image of the sequence to identify a location of a mouth of the subject in the respective image, analyzing the at least one image to identify the mouth of the subject in an open state at the identified location.

In a further implementation form of the first, second, and third aspects, analyzing the at least one target image comprises: analyzing the at least one target thermal image depicting maximal opening of the mouth to identify a plurality of tongue regions and/or a plurality of non-tongue regions, analyzing the at least one target thermal image to identify an estimated temperature of the plurality of tongue regions including the upper region of the tongue and/or the plurality of non-tongue regions, and providing the estimated temperature of at least one of the plurality of tongue regions including the upper region of the tongue and/or the plurality of non-tongue regions.

In a further implementation form of the first, second, and third aspects, further comprising: analyzing a temperature distribution and/or an aggregated temperature of the estimated temperature of at least one of the plurality of tongue regions including the upper region of the tongue and/or the plurality of non-tongue regions to identify an indication of a cheating attempt to artificially lower or raise the temperature.

In a further implementation form of the first, second, and third aspects, further comprising: receiving a sequence of a plurality of non-thermal images captured by a non-thermal sensor simultaneously with the thermal sensor, analyzing the sequence of the plurality of non-thermal images to identify at least one mouth parameter indicative of mouth disease, or identify no mouth disease, and in response to identifying no mouth disease, providing the estimated temperature of the upper region of the tongue.

In a further implementation form of the first, second, and third aspects, in response to identifying mouth diseases, further comprising correcting the estimated temperature of the upper region of the tongue according to the at least one mouth parameter.

In a further implementation form of the first, second, and third aspects, in response to identifying mouth diseases, further comprising inputting the at least one target thermal image and at least one non-thermal image into a mouth disease classifier trained on a training dataset of a plurality of target thermal images and a plurality of non-thermal images of a plurality of subjects depicting the at least one mouth parameter indicative of mouth disease captured by the thermal sensor and the non-thermal sensor and a ground truth label measurement indication of a core body temperature of the respective subject, wherein providing comprises providing the outcome of the mouth disease classifier.

In a further implementation form of the first, second, and third aspects, further comprising: receiving a sequence of a plurality of non-thermal color images captured by a non-thermal color sensor simultaneously with the thermal sensor, registering the sequence of the plurality of non-thermal color images with the sequence of the plurality of thermal images, analyzing the sequence of the plurality of non-thermal color images to identify at least one non-thermal color target image depicting the upper region of the tongue of the subject segmented according to color data of the respective image, wherein the at least one thermal target image corresponds to the at least one non-thermal color target image, wherein the upper region of the tongue in the at least one thermal image is registered to the segmented upper of the tongue of the at least one non-thermal color image.

In a further implementation form of the first, second, and third aspects, further comprising: executing by a user interface, instructions indicating to the subject to open the mouth of the subject, and in response to the execution of the instructions, receiving the sequence of the plurality of thermal images of the subject captured by the thermal sensor.

In a further implementation form of the first, second, and third aspects, further comprising: receiving acoustic signals captured by an acoustic sensor simultaneously with the thermal sensor, wherein the acoustic signals are time registered with the sequence of the plurality of thermal images, analyzing the acoustic signals to identify an indication of the open mouth of the subject, wherein analyzing the sequence of the plurality of thermal images to identify at least one target thermal image comprises the at least one target thermal image corresponds to the time registered portion of the acoustic signals indicative of the open mouth of the subject.

In a further implementation form of the first, second, and third aspects, further comprising: receiving at least one non-thermal image of the subject captured by a non-thermal sensor, analyzing the at least one non-thermal image of the subject to compute an estimated age of the subject, and adjusting the estimated temperature of the upper region of the tongue according to a correlation between age and tongue temperature.

In a further implementation form of the first, second, and third aspects, further comprising generating instructions for automatically opening a door of an enclosure to provide entry for the subject into the enclosure when the estimated temperature is below a threshold.

In a further implementation form of the first, second, and third aspects, the subject is in a vehicle, and the sequence of the plurality of thermal images depicts the subject in the vehicle captured with a window of the vehicle open.

In a further implementation form of the first, second, and third aspects, further comprising generating instructions for admitting the vehicle to a parking area when the estimated temperature is below a threshold.

In a further implementation form of the first, second, and third aspects, the thermal sensor is a non-contract sensors located remotely from the subject and not in contract with the subject during acquisition of the sequence of the plurality of thermal images.

In a further implementation form of the first, second, and third aspects, the estimated temperature of the upper region of the tongue is adjusted to estimate a core body temperature of the subject.

In a further implementation form of the first, second, and third aspects, further comprising monitoring the sequence of the plurality of thermal images to identify a continuously closed mouth of the subject for at least a predefined time threshold, and in response to the predefined time threshold being met, analyzing the at least one target thermal image to identify the estimated temperature of the upper region of the tongue.

In a further implementation form of the first, second, and third aspects, the analyzing the sequence of the plurality of thermal images and the analyzing the at least one target thermal image comprises inputting the sequence of the plurality of thermal images into temperature classifier, wherein the estimated temperature of the upper region of the tongue is an outcome of the temperature classifier, wherein the classifier is trained on a training dataset including, for each of a plurality of subjects, the sequence of thermal images, and a ground truth label of the estimated temperature of the upper region of the tongue of the respective subject, wherein for each subject, the ground truth label is automatically assigned to the sequence of thermal images of the respective subject by: monitoring the sequence of the plurality of thermal images to identify a continuously closed mouth of the respective subject for at least a predefined time threshold, and in response to the predefined time threshold being met, identifying, for each thermal image of the sequence, an upper region of the tongue, analyzing a pattern of the estimated temperature of the upper region for the sequence to identify a maximal value of the estimated temperature of the upper region of the tongue of the pattern, automatically labelling the sequence with the maximal value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 8:
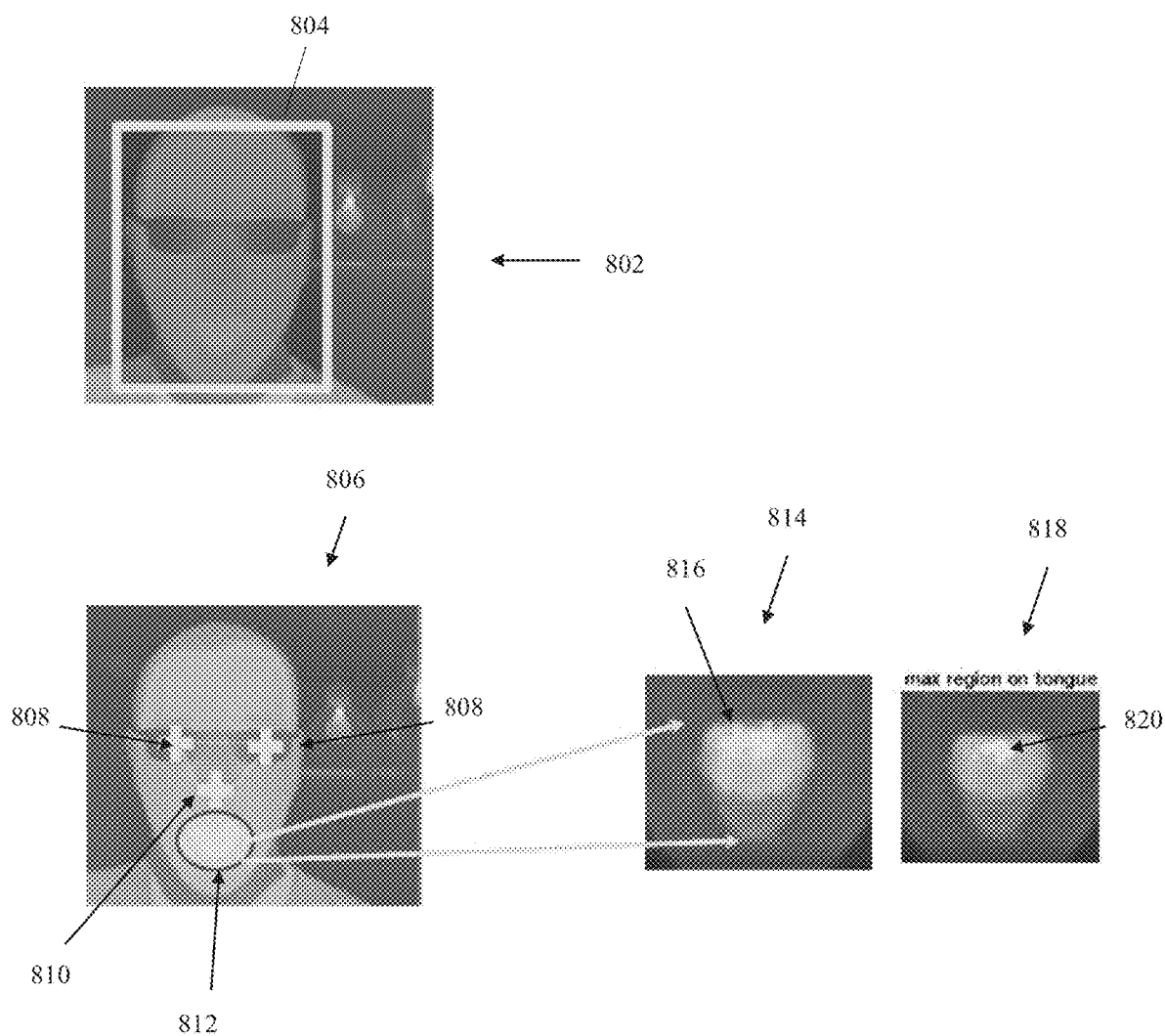
Figure 9:
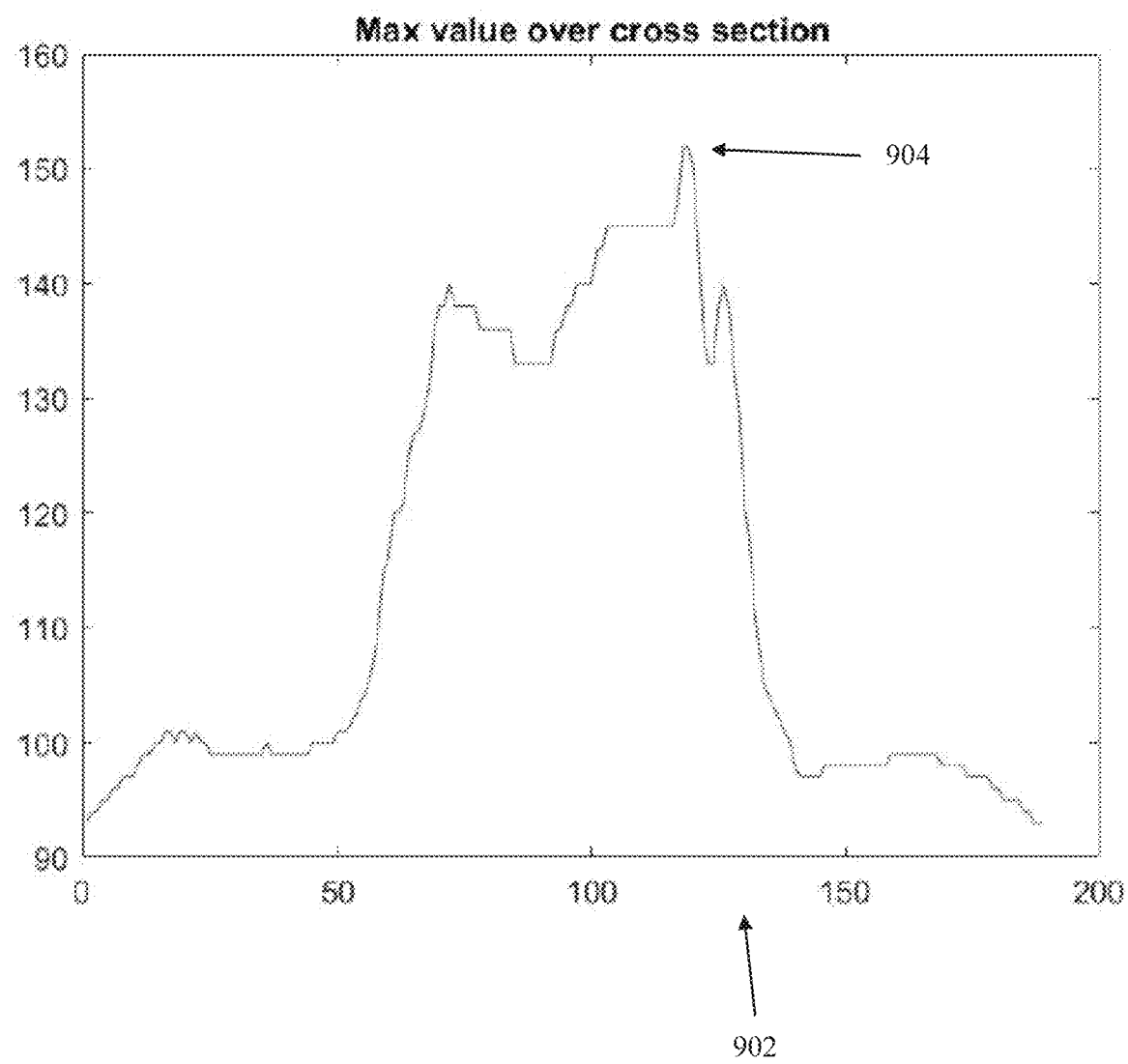

FIG. 8 includes schematics that depict an exemplary process for analyzing a thermal image to identify a target thermal image, in accordance with some embodiments of the present invention; and FIG. 9 is a schematic of a graph for computing the estimated temperature of the upper region of the tongue, in accordance with some embodiments of the present invention.

DESCRIPTION OF SPECIFIC EMBODIMENTS OF THE INVENTION

The present invention, in some embodiments thereof, relates to measurement of temperature of a body of a subject and, more specifically, but not exclusively, to a device and method for non-contact measurement of body temperature of a subject.

The term temperature may sometimes be interchanged with, and/or refer to, likelihood of fever. For example, in addition to, or alternatively to measure the temperature, a likelihood of fever is measured. The likelihood of fever may be a binary indication, e.g., fever or no fever, or a probability value indicative of likelihood of fever (e.g., in the range of 0-100%). The likelihood of fever may be according to a temperature threshold, e.g., temperature above the threshold denotes fever, or temperature below the threshold denotes no fever. Alternatively, the specific temperature is not necessarily measured, but another value such as pixel intensity value of thermal images at the upper tongue region is measured, and the likelihood of fever is determined accordingly, without necessarily providing an indication of temperature and/or providing the indication of temperature.

As used herein the term upper region of the tongue refer to the anatomical region of the tongue that borders between the body of the tongue and the root of the tongue, for example the body of the tongue just before the root of the tongue, which may include portions of the root of the tongue connected to the body of the tongue. The anatomical region may be represented by the location of the tongue where the vallate papillae are located, optionally the lateral portion of the tongue just before and/or including the foliate papillae. The anatomical region may be the part of the tongue that is proximal to and/or may include the terminal sulcus and/or foramen cecum.

As used herein, the term other parts (also referred to as regions) of the tongue may refer to the body of the tongue, the apex of the tongue, for example, with reference to a central axis (e.g., along the midline groove which may not be visible), such as the left side, or right side, towards the apex, towards the root, and the like. The other parts of the tongue may refer to the surface and/or sides of the tongue. The other parts of the tongue may exclude the lower part of the tongue that is close to the bottom of the mouth, in proximity to the frenulum.

As used herein, the term non-tongue parts (also referred to as regions) may refer to regions of the mouth cavity that are not part of the tongue. The non-tongue parts may refer to soft tissue, excluding teeth. The non-tongue parts may refer, for example, to the soft palate, the palatopharyngeal arch, the uvula, palatoglossal arch, tonsils (palatine tonsil), posterior wall of pharynx, the upper part of the mouth cavity, and the inner sides of the mouth. The non-tongue parts may exclude the region of the mouth below the tongue, such as the frenulum and sublingual region/folds.

As used herein, for clarity and simplicity of explanation, the phrase the upper part of the tongue is used as an example, such as a region of the thermal image which is identified and/or for which the temperature is estimated. One or more other parts of the tongue and/or non-tongue parts may be in addition to, and/or alternatives to the upper part of the tongue. For example, one or more other parts of the tongue and/or non-tongue parts are identified in the thermal images and/or for which temperature is measured, in addition to, and/or alternative to, identifying and/or measuring temperature for the upper part of the tongue.

An aspect of some embodiments of the present invention relates to systems, methods, an apparatus, and/or code instructions (e.g., stored on a memory and executable by hardware processor(s)) for measuring a temperature within a mouth cavity of a subject depicted in a thermal image, for example, an upper region of a tongue, other parts of the tongue (e.g., the surface and/or sides of the tongue excluding below the tongue), and/or non-tongue parts in the mouth cavity (e.g., soft tissue, excluding teeth) of the subject depicted in a thermal image. A sequence of thermal images of a subject captured by a thermal sensor is received. The sequence may be analyzed to identify a set of frames where the mouth of the subject is in an open state. The set of frames may be analyzed to identify one or more target thermal images depicting a maximal opening of the mouth of the subject. The one or more target thermal images may be analyzed to identify the upper region of the tongue of the subject, and/or one or more of the other parts of the tongue, and/or one or more of the non-tongue parts. The target thermal image is analyzed to compute an estimated temperature of the upper region of the tongue and/or other tongue regions and/or non-tongue regions. The temperature of the upper region and/or other tongue regions and/or non-tongue regions provides an indication of the core body temperature of the subject. The temperature of the upper region of the tongue and/or other tongue regions and/or non-tongue regions may be evaluated to determine whether the subject has fever (e.g., due to infection, for example, as a screening to the subject being infected with a respiratory virus such as COVID-19 also known as Corona). Action may be taken when the subject is determined to have fever or not to have fever. For example, the subject with fever may be denied entry to an enclosure (e.g., building, airport) and the subject without fever may be admitted to the enclosure. The subject may be located within a vehicle, with the images of the subject captured while the subject is inside the vehicle, optionally with the windows down. Entry of the vehicle into a parking area (e.g., parking lot, garage) and/or further driving (e.g., crossing a border, entering a city, entering a toll highway, crossing a bridge, boarding a ferry) may be denied when the subject is determined to have fever (e.g., by automatically generating instructions for execution by a control to activate a mechanism to close a gate and/or keep the gate closed). Entry of the vehicle may be permitted when the subject is determined not to have fever (e.g., by automatically generating instructions for execution by a control to activate a mechanism to open a gate).

Optionally, the estimated temperature of the upper region of the tongue and/or other parts of the tongue and/or non-tongue parts is computed for multiple target thermal images. A maximal value of the estimated temperature, optionally depicted in a single (or small number of) target thermal image, is identified. The maximal value represents the respective temperature of the respective region.

At least some implementations of the systems, methods, apparatus, and/or code instructions described herein address the technical problem of accurate non-contact measurement of an indication of core body temperature (CBT), for example, for detection of whether the subject has a fever (e.g., resulting from an infection) or not. At least some implementations of the systems, methods, apparatus, and/or code instructions described herein improve the technology of non-contact measurement of an indication of CBT. Accurate non-contact measurement of an indication of CBT is performed, for example, for screen a large number of people (e.g., standing in line, and/or sitting in a vehicle), which may be entering an enclosure such as a shopping mall, office building, boarding a plane, entering a subway/train station, and/or the vehicle is entering a parking area and/or for the vehicle to keep on driving. Screening may be performed during an outbreak of a viral disease, for example, COVID-19 and/or the flu, to detect those with fever likely resulting from an infection by the viral disease. Preventing entry to those with fever may reduce spread of the viral disease to other people located within the enclosure. It is noted that measurement of the CBT may be performed, such as to screen for fever resulting from the viral disease and/or other causes may be performed, for example, in a doctor's office and/or at home. Standard approaches to taking temperature using contact sensors, although highly accurate, are non-practical for rapid screening (e.g., entrance to the enclosure, at home, at the doctor's office, entering a parking area, entering another zone with a car) for several reasons, for example, long time to obtain a reading, use of mercury which is a toxic substance, and/or spread of infection from the thermometer which is being used in contact with multiple people. Other approaches for taking temperature using a non-contact sensor, is less accurate since temperature is being measured in body locations which are less correlated with CBT, for example, the forehead. For example, during the winter when temperatures are very cold outside, the forehead temperature of the subject may be very low due to exposure to winds and the low environment temperature, while the CBT of the subject is very high, even when the subject is infected with the viral disease. In such a case, the subject is false identified as having no fever, when in fact, a fever (e.g., due to infection with the viral disease) is present.

At least some implementations of the systems, methods, apparatus, and/or code instructions described herein provide a solution to the above mentioned technical problem, and/or improve the technology of non-contact measuring a temperature indicative of CBT, by using thermal images captured by a thermal sensor to compute a temperature of an upper region of a tongue of a subject and/or other tongue regions and/or non-tongue regions, and/or an aggregation of one or more of the regions (e.g., average, weighted average), while contained in the oral cavity. Inventors discovered that the temperature of the upper region of the tongue and/or other tongue regions and/or non-tongue regions, and/or aggregation of one or more of the regions, provides a good approximation to a bottom of mouth (BoM) temperature measurement, which is one of the most widely used and validated methods of CBT, for example, for detection of fever. Measuring the temperature of the upper region of the tongue and/or other tongue regions and/or non-tongue regions provides several advantages over other approaches to measuring temperature. For example, the temperature of the upper region of the tongue and/or other tongue regions and/or non-tongue regions is less sensitive to the external environment (e.g., heat, cold, presence of wind, humidity, environmental temperature), providing for screening for entrance into parking areas, other zones accessed by driving, and/or enclosures (e.g., outside the enclosure, or right after entry into the enclosure). In another example, the temperature of the upper region of the tongue and/or other tongue regions and/or non-tongue regions may be performed by using thermal sensors (e.g., infrared thermography (IRT)) cameras from a distance away from the subject (i.e., non-contact, rapid, reduce risk of spread of infection) by having the subject open their mouth for a few seconds.

Measuring multiple regions, including the upper region of the tongue and/or other tongue regions and/or non-tongue regions may help to detect people that are trying to cheat, for example a person with fever drinks a cold beverage in an attempt to be diagnosed as not having a fever. In such a case, one or more regions of the tongue and/or non-tongue regions may still register a high temperature, indicating that the lower temperature is artificially created. In such a case, one or more regions of the tongue and/or non-tongue regions may indicate abnormally cold temperatures that are not normally present, indicating artificial tampering. For example, a temperature of 15 degrees due to having ice in the mouth, where a body temperature of 15 is clearly an indication of tampering. In another example, a person may have drunk a warn beverage in an attempt to be diagnosed with fever (e.g., in order to collect sick pay, or be except from performing certain tasks). In such a case, one or more regions of the tongue and/or non-tongue regions may still register a low/normal temperature, indicating that the higher temperature is artificially created. In such a case, one or more regions of the tongue and/or non-tongue regions may indicate abnormally hot temperatures that are not normally present, indicating artificial tampering. For example, a temperature of 47 degrees due to having drunk boiling water, where a body temperature of 47 is clearly an indication of tampering. In yet another example, variation in temperatures of the different tongue and/or non-tongue regions may indicate an inaccurate measurement, for example, mouth not closed long enough before measurement taken and/or attempt to cheat by drinking cold beverages.

Inventors discovered that the temperature of the upper region of the tongue and/or other tongue regions and/or non-tongue regions provides a good approximation to a bottom of mouth (BoM) temperature measurement when the mouth has been closed (e.g., no breathing, speaking, and/or food/liquid intake) for at least a predefined time interval (e.g., at least 1-5 minutes) prior to measurement of the temperature of the upper region of the tongue. At least some implementations of the systems, methods, apparatus, and/or code instructions described herein monitor the subject to determine whether the mouth is closed prior to performing the measurement of the temperature of the upper region of the tongue. Moreover, Inventors discovered that when the subject is suffering from mouth conditions which may be due to underlying medical conditions (e.g., Diabetes Mellitus type 2) which may affect the tongue appearance, physiology, and/or temperature, at least some implementations of the systems, methods, apparatus, and/or code instructions described herein may detect the absence of such mouth conditions prior to measurement of the temperature of the upper region of the tongue, and/or may perform the measurement of the temperature of the upper region of the tongue according to the detected presence of such mouth conditions, for example, adjusting the measured temperature according to the mouth condition, and/or using a classifier trained to measure temperature using thermal images in subjects suffering from the mouth condition.

At least some implementations of the systems, methods, apparatus, and/or code instructions described herein address the technical problem of automatically generating a training dataset for training a classifier and/or machine learning for measuring an indication of CBT of a person, without requiring contact measuring of temperature of the person and/or without requiring manual labelling of data. At least some implementations of the systems, methods, apparatus, and/or code instructions described herein improve the technological field of machine learning (ML) models and/or classifiers. In some embodiments, the technical problem is addressed, and/or the improvement is provided, by automatically analyzing thermal images of the subject to identify at least one thermal image with a maximal value of temperature of the upper region of the mouth of the respective subject. An automated label including the maximal value may be created for automatically labelling the identified thermal image(s) and/or the set of acquired thermal images (or subset thereof), which are included in the training dataset for training the ML model and/or classifier.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
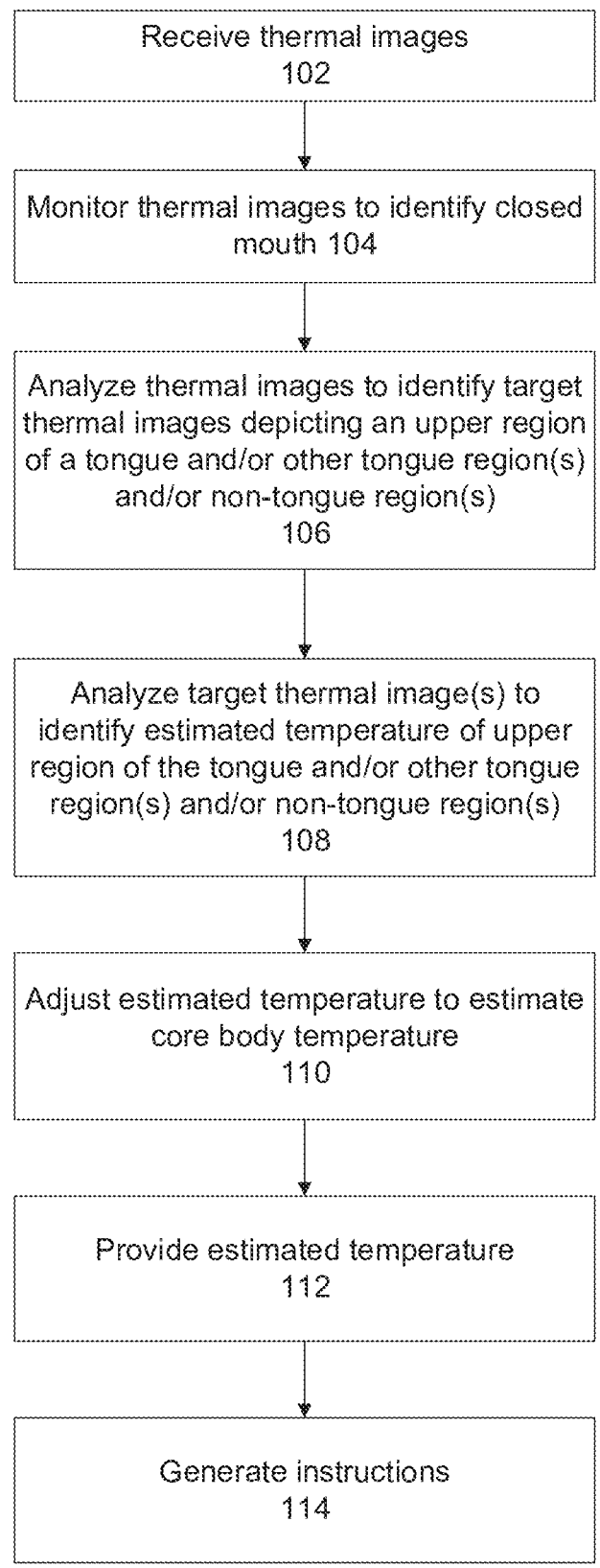
FIG. 1 is a flowchart of a method for measuring a temperature of an upper region of a tongue of a subject from a thermal image, in accordance with some embodiments of the present invention.
Figure 2:
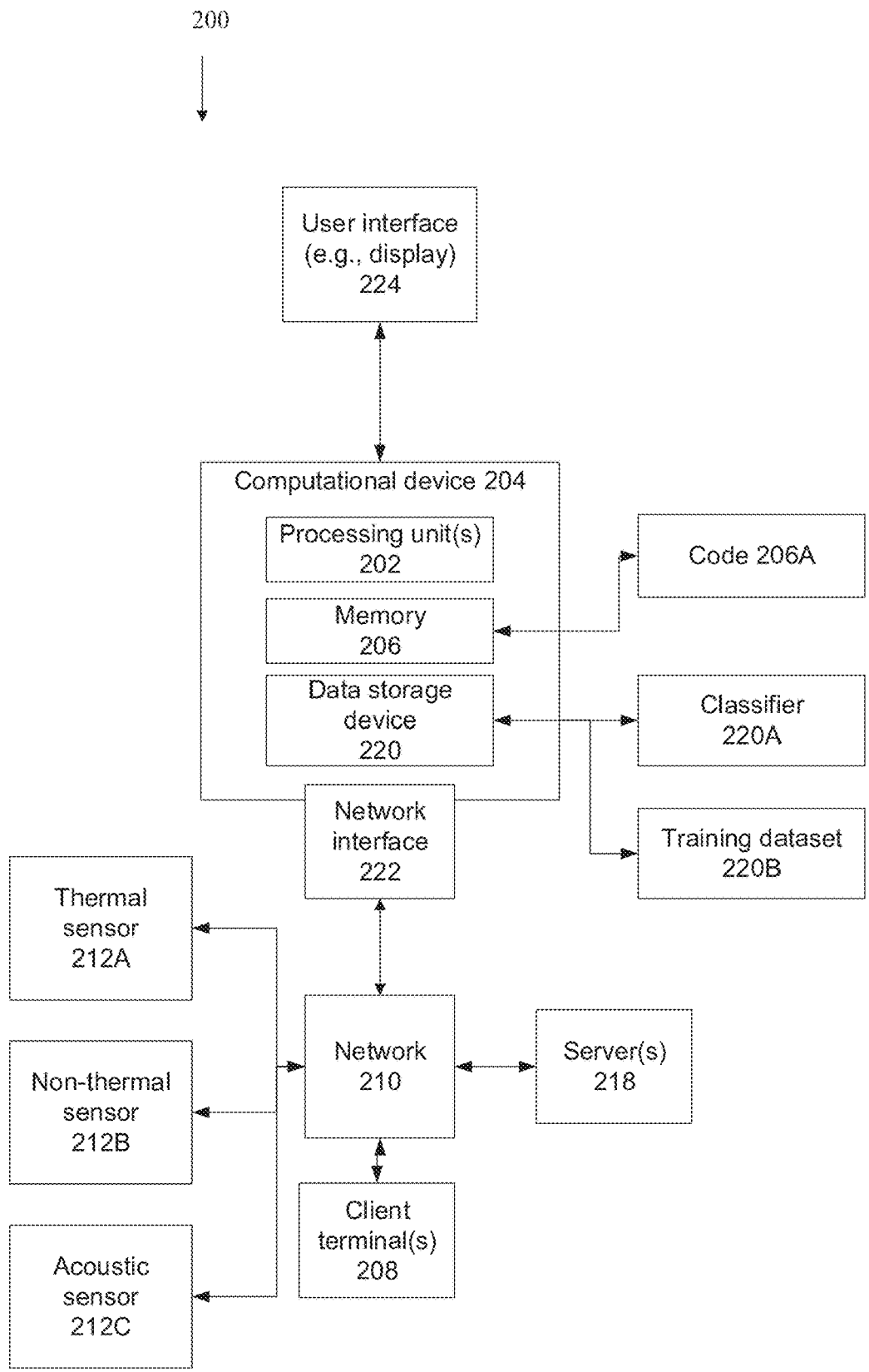
FIG. 2 is a block diagram of components of a system for measuring a temperature of an upper region of a tongue of a subject from a thermal image, in accordance with some embodiments of the present invention.
Figure 3:
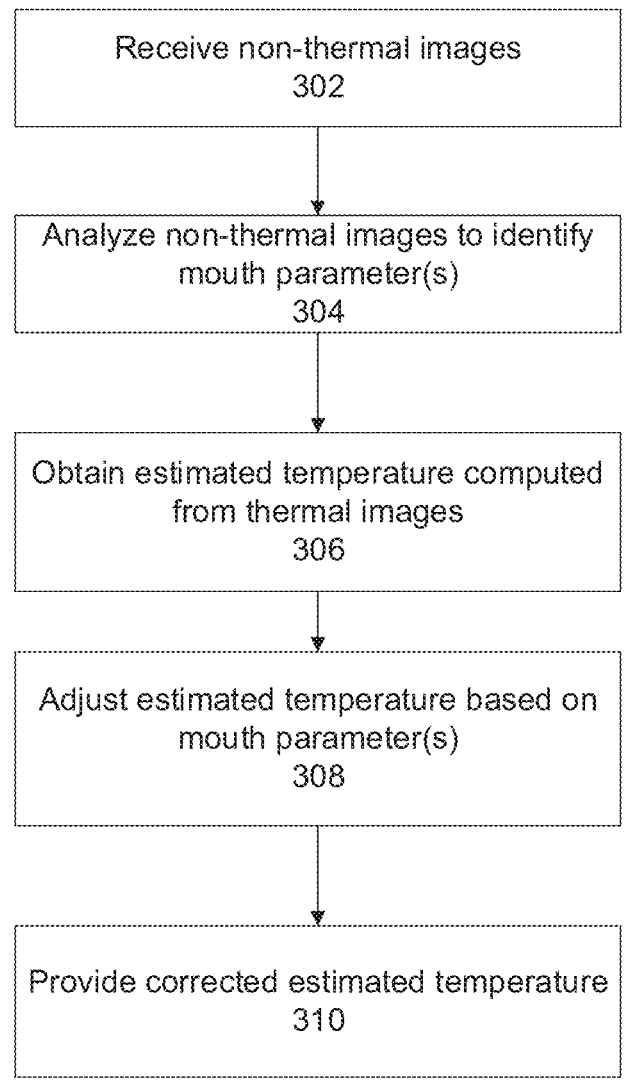
FIG. 3 is a flowchart of a method for correcting the temperature based on identified mouth parameter(s), in accordance with some embodiments of the present invention.
Figure 4:
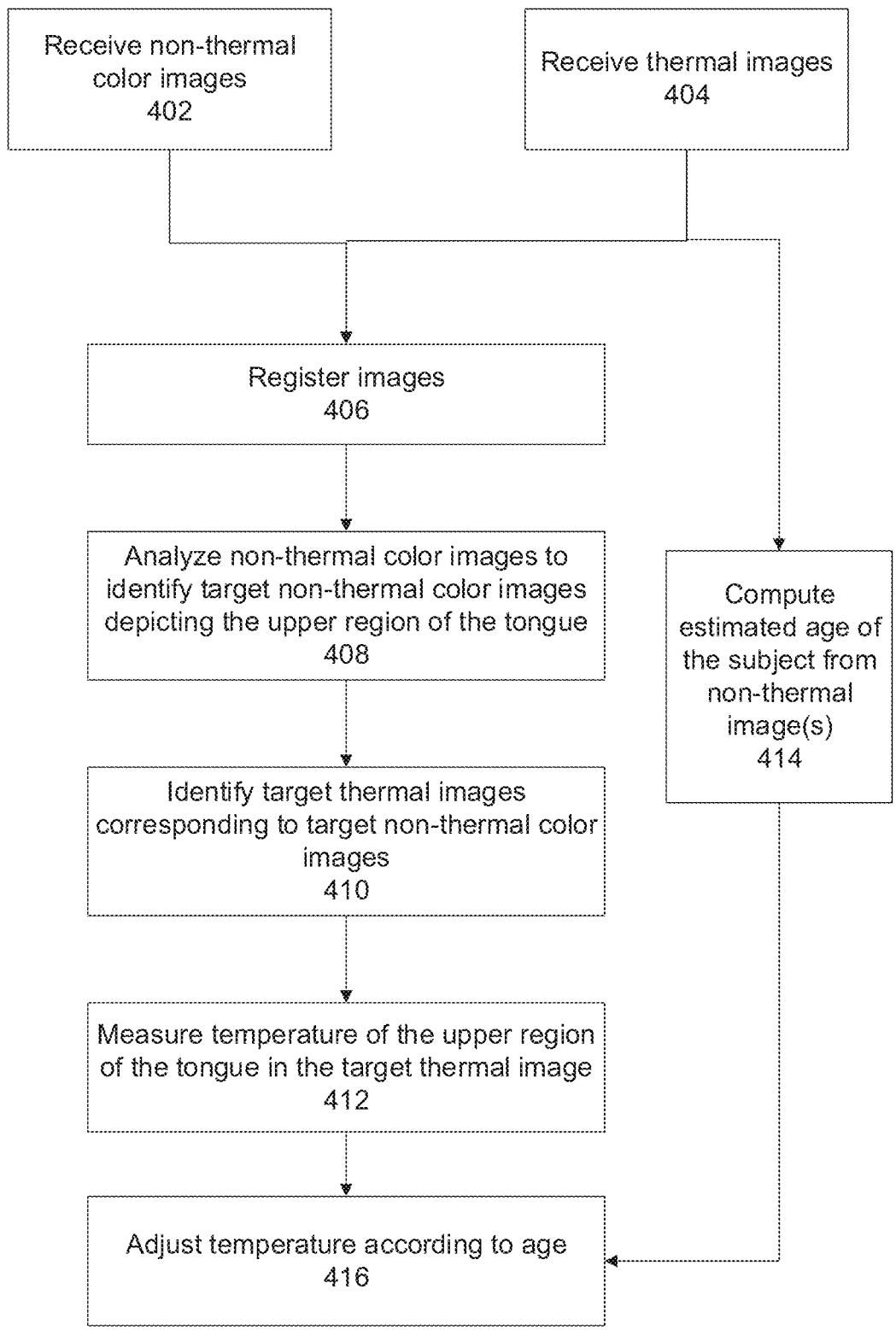
FIG. 4 is a flowchart of a method for using non-thermal images to identify the upper region of the tongue in thermal images used to estimate the temperature, in accordance with some embodiments of the present invention.
Figure 5:
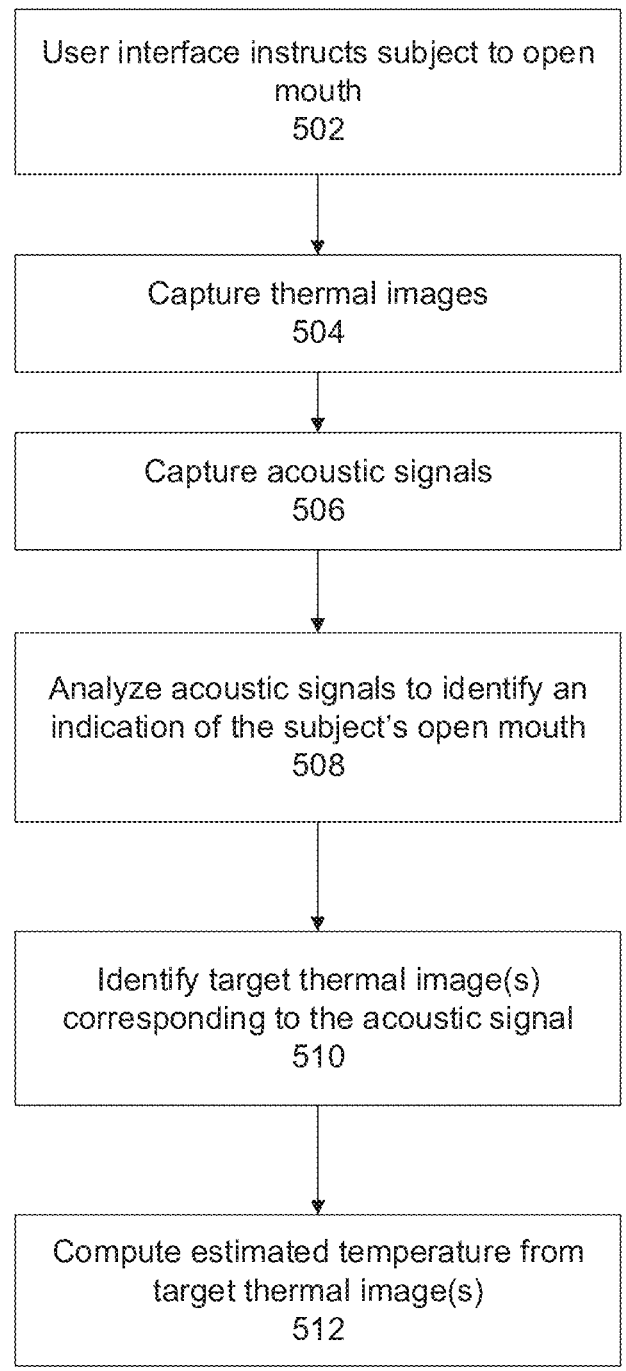
FIG. 5 is a flowchart of a method for using acoustic signals to detect when the user opened their mouth and measuring the temperature in the upper region of the tongue in the corresponding thermal images.

Reference is now made to FIG. 1, which is a flowchart of a method for measuring a temperature of an upper region of a tongue of a subject from a thermal image, in accordance with some embodiments of the present invention. Reference is also made to FIG. 2, which is a block diagram of components of a system 200 for measuring a temperature of an upper region of a tongue of a subject from a thermal image, in accordance with some embodiments of the present invention. Reference is also made to FIG. 3, which is a flowchart of a method for correcting the temperature based on identified mouth parameter(s), in accordance with some embodiments of the present invention. Mouth parameters may affect the measured temperature. Adjusting the measured temperature based on the mouth parameters may increases the accuracy of the temperature. Reference is also made to FIG. 4, which is a flowchart of a method for using non-thermal images to identify the upper region of the tongue in thermal images used to estimate the temperature, in accordance with some embodiments of the present invention. Since the upper region of the tongue may be located with higher accuracy in non-thermal images, the identified upper region of the tongue in the non-thermal images may be used to locate the upper region of the tongue in thermal images used to estimate the temperature. Reference is also made to FIG. 5, which is a flowchart of a method for using acoustic signals to detect when the user opened their mouth and measuring the temperature in the upper region of the tongue in the corresponding thermal images.

System 200 may implement the features of the method described with reference to FIGS. 1 and 3-5, by one or more hardware processors 202 of a computing device 204 executing code instructions stored in a memory (also referred to as a program store) 206.

One or more classifiers described herein may be implemented, for example, as one or more or combination of: neural networks of various architectures (e.g., fully connected, deep, encoder-decoder), support vector machines (SVM), logistic regression, k-nearest neighbor, decision trees, boosting, random forest, and the like. Classifiers may be trained using supervised approaches and/or unsupervised approaches.

Computing device 204 may be implemented as, for example, a client terminal, a server, a virtual machine, a virtual server, a computing cloud, a mobile device, a desktop computer, a thin client, a Smartphone, a Tablet computer, a laptop computer, a wearable computer, glasses computer, and a watch computer.

Multiple architectures of system 200 based on computing device 204 may be implemented. In an exemplary implementation, computing device 204 storing code 206A may be implemented as one or more servers (e.g., network server, web server, a computing cloud, a virtual server) that provides services (e.g., one or more of the acts described with reference to FIG. 1) to one or more servers 218 and/or client terminals 208 over a network 210, for example, providing software as a service (SaaS) to the servers 218 and/or client terminal(s) 208, providing software services accessible using a software interface (e.g., application programming interface (API), software development kit (SDK)), providing an application for local download to the servers 218 and/or client terminal(s) 208, and/or providing functions using a remote access session to the servers 218 and/or client terminal(s) 208, such as through a web browser and/or viewing application. For example, users use client terminals 208 to access computing device 204 to provide the thermal images and/or receive results, such as computed temperature of the upper region of the tongue of the subject depicted in the thermal images. In another example, the analysis of images to measure temperature of the upper region of the tongue (e.g., according to FIG. 1) may be performed by computing device 204, and training of classifier(s) (e.g., 220A, as described herein) may be performed by another device (e.g., server(s) 218). In another example, the analysis of the images and the training of classifiers may both be performed by computing device 204.

Computing device 204 receives thermal images captured by a thermal sensor 212A. Thermal sensor 212A may be implemented as an infrared thermography (IRT) camera capturing radiation that correlates with temperature, for example, in the long-infrared (IR) range of the electromagnetic spectrum (e.g., about 9000-14000 nanometers). Other thermal sensors may be used, for example, InGaAs sensors, FPA sensors, and the like. Computing device 204 may receive non-thermal images captured by non-thermal sensor 212B capturing radiation that does not necessarily correlate with temperature, optionally a color sensor, optionally a visible light based sensor, for example, a red-green-blue (RGB) sensor such as CCD and/or CMOS sensors. Computing device 204 may receive acoustic data captured by an acoustic sensor 212C, for example, a microphone. Thermal and/or non-thermal images and/or acoustic images may be captured in (e.g. near) real time, for correlation of data, for (near) real time measurement of the temperature of the upper part of the tongue, as described herein. Alternatively or additional, one or a sequence of thermal images (and/or non-thermal images and/or acoustic data) may be captured for training classifier(s) 220A, as described herein. Sensor(s) 212A-C may transmit captured images to computing device 204, for example, via a direct connected (e.g., local bus and/or cable connection and/or short range wireless connection), and/or via a network 210 and a network interface 222 of computing device 204 (e.g., where sensors 212A-C are connected via internet of things (IoT) technology and/or are located remotely from the computing device).

Network interface 222 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 206 stores code instructions executable by hardware processor(s) 202. Exemplary memories 206 include a random access memory (RAM), read-only memory (ROM), a storage device, non-volatile memory, magnetic media, semiconductor memory devices, hard drive, removable storage, and optical media (e.g., DVD, CD-ROM). For example, memory 206 may code 206A that execute one or more acts of the method described with reference to FIG. 1.

Computing device 204 may include data storage device 220 for storing data, for example, classifier(s) 220A and/or training dataset(s) 220B, as described herein. Data storage device 220 may be implemented as, for example, a memory, a local hard-drive, a removable storage unit, an optical disk, a storage device, a virtual memory and/or as a remote server 218 and/or computing cloud (e.g., accessed over network 210). It is noted that classifier(s) 220A and/or training dataset(s) 220B may be stored in data storage device 220, for example, with executing portions loaded into memory 206 for execution by processor(s) 202.

Computing device 204 and/or client terminal(s) 208 and/or server(s) 218 include and/or are in communication with one or more physical user interfaces 224 that include a mechanism for implementing the generated instructions, for example, a display for presenting a video asking the user to open their mouth and say AHHHH, and/or for presenting the measured temperature of the upper region of the tongue, and/or speakers for playing an audio message asking the user to open their mouth and say AHHHH. User interface 224 may include a mechanism for inputting data. Exemplary user interfaces 224 include, for example, one or more of, a touchscreen, a display, a keyboard, a mouse, and voice activated software using speakers and microphone. Acoustic sensor 212C may be a component that is independent of and/or external to user interface 224, and/or acoustic sensor 212 may be integrated with user interface 224.

Referring now back to FIG. 1, at 102, a sequence of thermal images of a subject captured by a thermal sensor is received. The sequence of thermal images depict at least the mouth of the subject. The sequence of images may be, for example, a video including frames, and/or individually acquired images that may be captured at equal spaced apart time intervals and/or at non-equal spaced apart time intervals.

Optionally, the thermal sensor is a non-contract sensor located remotely from the subject. The thermal sensor is not in contract with the subject during acquisition of the sequence of thermal images.

Optionally, at 104, the sequence of the thermal images is monitored to identify a continuously closed mouth of the subject for at least a predefined time threshold, for example, in the range of about 1-5 minutes, or about 1-3 minute, or at least 1 minute, or at least 2 minutes, or other values.

Optionally, the thermal images are monitored, for example, for detecting a temperature within the image below a threshold set below the lowest expected temperature found in an open mouth and/or tongue of a subject. Temperatures on the surface of the face of subjects having their mouths closed may be expected to be lower than the threshold, indicating that the mouth of the subject is closed. In another example, the thermal images are monitored by feeding the images into a trained closed mouth classifier that generates an outcome of whether the subject depicted in the image has their mouth open or closed. The closed mouth classifier may be trained on a training dataset of thermal images labeled with an indication of whether the respective subject depicted therein has their mouth open or closed.

Inventors discovered that the temperature of the upper part of the tongue may be used as an accurate approximation to the bottom of mouth temperature (where the bottom of mouth temperature is an accurate indication of core body temperature to detect fever) when the mouth has been closed (i.e., no breathing, speaking, and/or food/liquid intake) for at least the predefined time threshold before the temperature of the upper part of the tongue is estimated.

The subject may be instructed to keep their mouth closed for at least the predefined time threshold, for example, manually by an operator, and/or automatically by a user interface (e.g., graphical user interface (GUI)) presented on a display and/or playing an audio recording on a speaker.

Alternatively, the subject is manually and visually monitored by an operator to make sure that the patient has not opened their mouth for at least the predefined time interval.

Alternatively, non-thermal images of the subject are captured by a non-thermal sensor (e.g., as described herein). The non-thermal images may be monitored to identify that the mouth of the subject is continuously closed, for example, by detecting the shape of the lips of the closed mouth and/or detecting the shape of an open mouth, for example, using a template, and/or the trained closed mouth classifier trained on non-thermal images.

The automatic analysis of images to determine whether the patient opened their mouth may be done to prevent cheating by the user to lower their perceived body temperature by cooling their tongue such as when the user has a fever, for example, when the human operator is not paying attention, and/or in cases where there is no human operator such as an automated system that grants access (e.g., opens a door for entry) to subjects determined not to have a fever.

Figure 6:
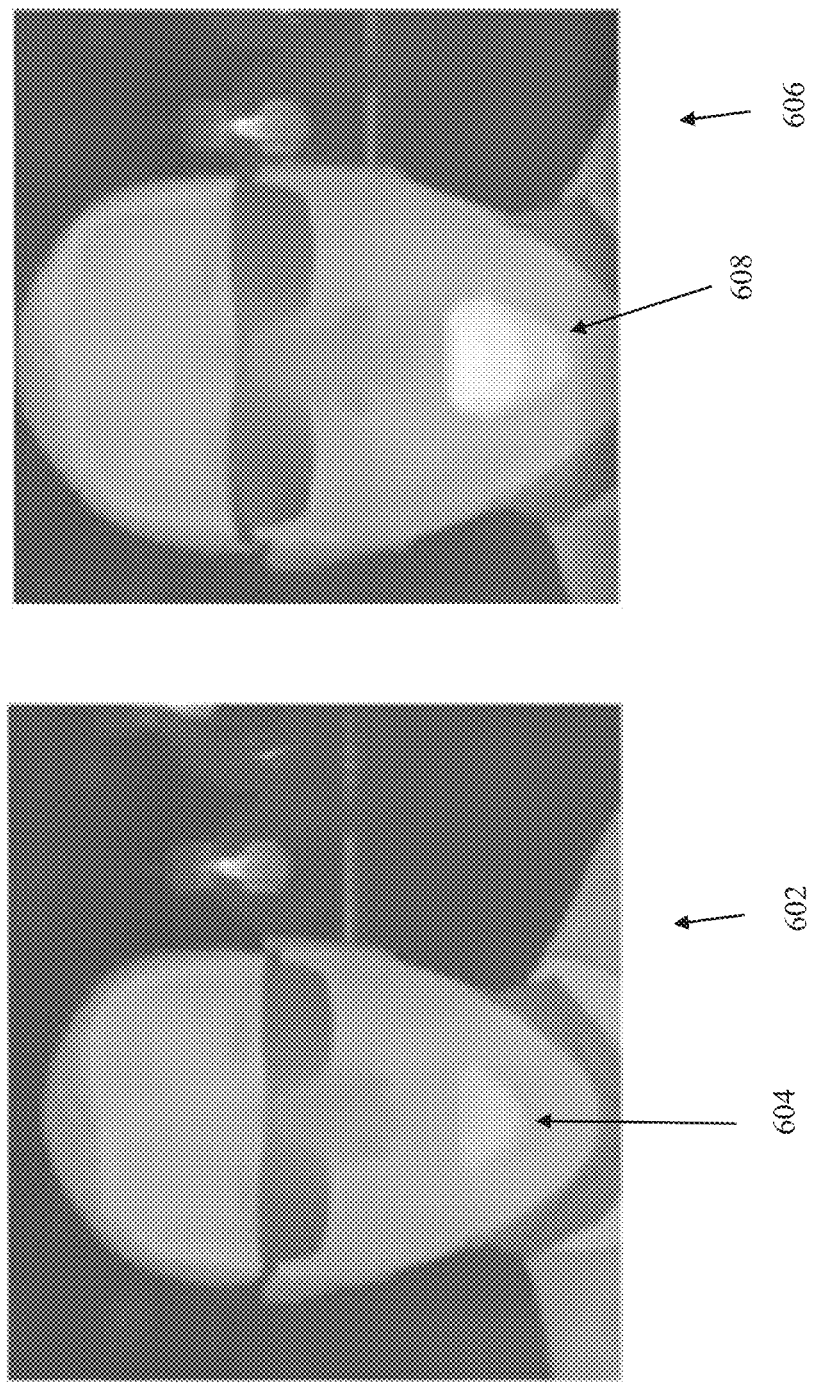
FIG. 6 is a schematic depicting changes in temperature of the tongue of a subject depicted in thermal images, in accordance with some embodiments of the present invention.

Reference is now made to FIG. 6, which is a schematic depicting changes in temperature of the tongue of a subject depicted in thermal images, in accordance with some embodiments of the present invention. Thermal image 602 depicts a subject with an open mouth (i.e., open mouth state) 604 indicating a normal temperature. Thermal image 606 depicts the subject with the open mouth 608 indicating a higher temperature, for example, due to fever. The presence of the higher temperature emulating fever was obtained by the subject drinking a warm liquid after capturing of image 602 and prior to capture of image 606. The pixel intensity values of pixels in mouth 608 of image 606 are significantly whiter than pixels in mouth 604 of image 602, indicating that the temperature depicted in mouth 608 of image 606 is higher than the temperature in mouth 604 of image 602, for example, indicative of fever.

Referring now back to FIG. 1, at 106, the sequence of thermal images is analyzed to identify one or more target thermal images depicting an upper region of a tongue of the subject and/or other tongue regions and/or non-tongue regions, i.e., the mouth of the subject is open and/or the tongue of the subject is sticking out of the mouth.

Optionally, the feature described with reference to 106 is implemented in response to the predefined time threshold of 104 being met. For example, when one or more target thermal images depict the upper region of the tongue before the predefined time threshold is met, the subject may be instructed to repeat the procedure of waiting with their mouth closed for at least the predefined time threshold, for example, by the operator, by an audio message, and/or by a message presented on the GUI.

Optionally, the sequence is analyzed to identify a location of a mouth of the subject in the respective image. An open state of the mouth may be detected at the identified location of the mouth. The sequence, optionally the images depicting the mouth in the open state, is analyzed to identify one or more images depicting a maximal opening of the mouth. The target thermal images are the image for the mouth in the open state, optionally the maximal opening of the mouth, is detected.

Optionally, the target thermal image(s) are analyzed to identify the tongue in the open mouth, optionally maximally opened mouth, of the subject depicted therein. The target thermal image may be analyzed to identify multiple tongue regions including the upper region of the tongue and/or other tongue regions and/or non-tongue regions.

Figure 7:
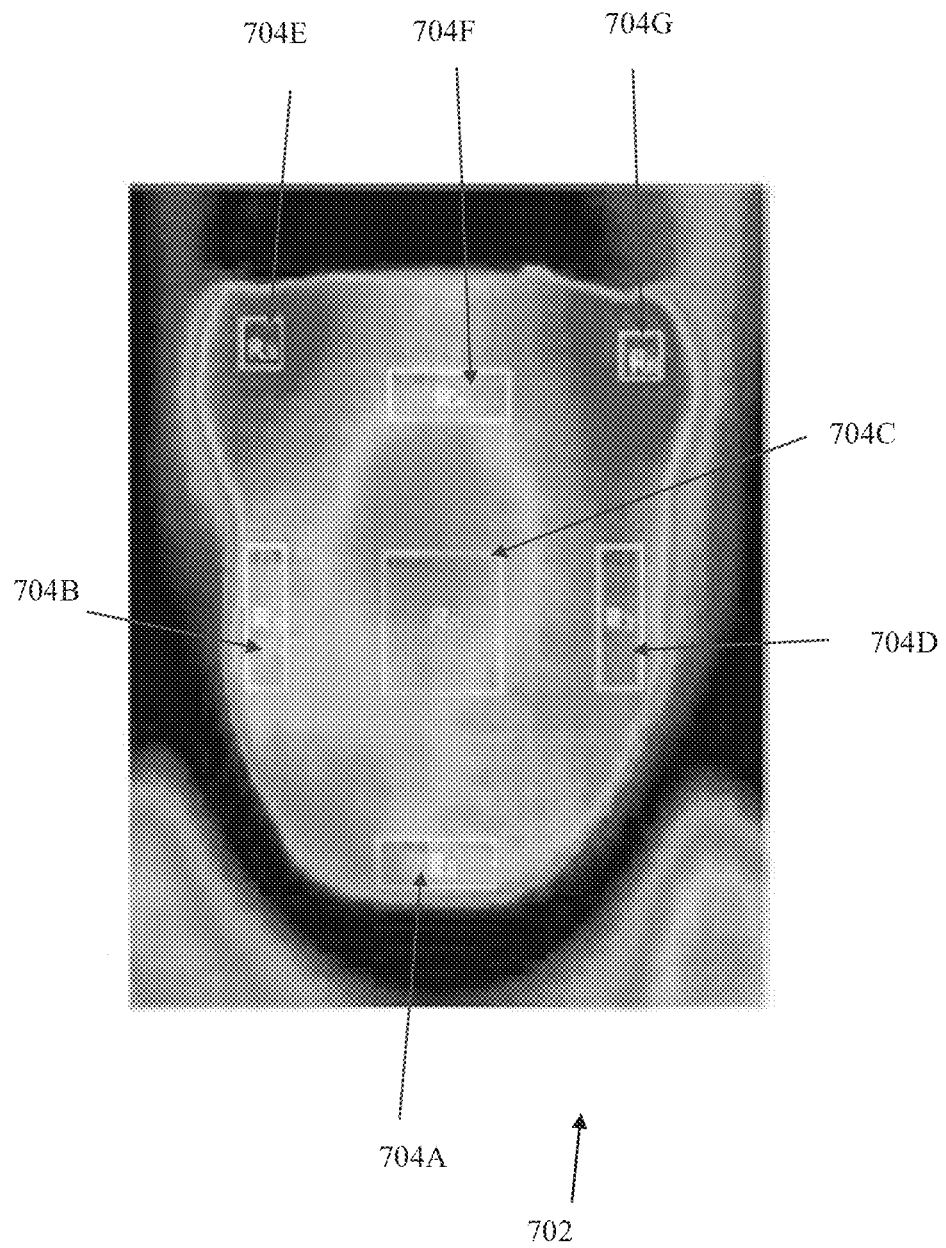
FIG. 7 is a thermal image of a tongue of the subject capture depicting multiple tongue regions from which upper region(s) of tongue are identified, in accordance with some embodiments of the present invention.

Reference is now made to FIG. 7, which is a thermal image 702 of a tongue of the subject captured when the tongue is out of the mouth of the subject, depicting multiple tongue regions 704A-G, from which upper region of tongue (i.e., one or more of 704E and 704G) are identified, in accordance with some embodiments of the present invention. Temperatures vary between the different tongue regions 704A-G, as indicated by the different pixel intensity values of pixels of the different regions. As shown pixel values of regions 704E and 704G are higher than other regions 704A-D, and 704F, indicating a better indication of the core body temperature and/or bottom of mouth temperature.

Optionally, the temperature distribution measured for tongue regions 704A-G is compared to a normal and/or expected distribution measured for normal and/or health subjects without fever and/or with fever. The comparison may be used to detect people trying to cheat, by artificially adjusting their mouth temperature (e.g., by drinking warn or hot beverages), as described herein.

Reference is now made to FIG. 8, includes schematic which depicts an exemplary process for analyzing a thermal image to identify a target thermal image, in accordance with some embodiments of the present invention. At 802, a boundary box 804 is generated, for example, by segmentation code, by template matching, based on an analysis of shapes indicative of the head, and/or by a trained classifier. Boundary box 804 encloses a face of a subject depicted in the thermal image. At 806, within boundary box 804 (not shown in 806 for clarity), eyes 808 and/or nose 810 are detected, for example, by segmentation code, by template matching, based on an analysis of shapes indicative of the eye and/or nose, and/or by a trained classifier. Mouth region 812 may be detected based on detected eyes 808 and/or nose 810, for example, by code that searches the region below eyes 808 and/or nose 810, and/or for example, by segmentation code, by template matching, based on an analysis of shapes indicative of the mouth, and/or by a trained classifier. At 814, the back of the tongue region 816 may be identified within mouth region 812. At 818, the maximal temperature within back of tongue region 816 may be identified, for example, by identifying the local maximal pixel intensity values. It is noted that 818 may be computed from 818 without 814, for example, by identifying the local maximal pixel intensity values of mouth region 812.

Referring now back to FIG. 1, at 108, the target thermal image is analyzed to identify an estimated temperature of the upper region of the tongue, and/or other tongue regions, and/or non-tongue regions. Alternatively, non-target thermal image(s) are analyzed (to identify the estimated temperature of the upper region of the tongue) in addition to the target thermal images, for example, images where the mouth is partially open and/or closed. Alternatively, the entire sequence (or portion thereof) is analyzed to identify the estimated temperature of the upper region of the tongue.

Optionally, an aggregation temperature is computed from multiple tongue and/or non-tongue regions, for example, an average, or weighted average. Alternatively or additionally, multiple temperatures for the multiple tongue and/or non-tongue regions represent a temperature distribution. The aggregation temperature and/or temperature distribution may be analyzed to determine whether the estimated temperature is feasible, and/or represents an error, such as mouth not closed long enough before opening for temperature measurements, and/or attempt at cheating by artificially changing the temperature of the mouth, as described herein. The analysis may be performed, for example, by comparing the aggregated temperature and/or temperature distribution to aggregated temperatures and/or temperature distributions computed from thermal images of individuals with normal temperatures, individuals with fever, and/or individuals with cheating attempts and/or mouth not closed long enough. The comparison may be performed, for example, using a set of rules (e.g., above or below threshold), for example, relative to a high temperature threshold and/or high temperature distribution indicative of artificially created high mouth temperature and/or relative to a low temperature threshold and/or low temperature distribution indicative of artificially created low mouth temperature. The comparison may be performed using a classifier trained on a training dataset of thermal images labeled with an indication of normal, temperature, cheating and/or mouth not closed long enough. The outcome of the classifier is an indication of whether cheating and/or mouth not closed long enough is suspected. When the person is suspected of cheating, an alert may be generated, for example, presented on a display, and/or instructions generated accordingly (e.g., denied entry into the enclosure).

Optionally, a pattern, which may be stored as a dataset, of the estimated maximal temperature of the upper region of the tongue in each of the target thermal images and/or non-target thermal images and/or entire sequence (or portion thereof) is computed. A maximal value of the pattern (e.g., of the dataset) is identified. The maximal value indicates the estimated temperature of the upper region of the tongue.

Reference is now made to FIG. 9, which is a schematic of a graph 902 for computing the estimated temperature of the upper region of the tongue, in accordance with some embodiments of the present invention. Graph 902 is created by computing the maximal temperature for each of the target thermal images that depict the mouth in the open state. The maximal temperature for each target thermal image may be obtained from the identified upper region of the tongue, as described herein. Graph 902 is created by plotting the maximal temperature (on the y-axis) as a function of sequentially numbered target thermal images (on the x-axis). A maximal value 904 of graph 902 is identified. Maximal value 904 represents the estimated temperature of the upper region of the tongue.

Referring now back to FIG. 1, at 108, another approach for analyzing the sequence of thermal images and/or target thermal images to identify the estimated temperature of the upper region of the tongue and/or other tongue region(s) and/or non-tongue region(s) is described. Optionally, the sequence of the thermal images, and/or the sequence of thermal images are inputted into a temperature classifier.

The estimated temperature of the upper region of the tongue is an outcome of the temperature classifier. The temperature classifier may be is trained on a training dataset including, for each of multiple subjects, a sequence of thermal images, and a ground truth label of the estimated temperature of the upper region of the tongue of the respective subject. Optionally, for each subject, the ground truth label is automatically assigned to the sequence of thermal images of the respective subject by the following exemplary process: the sequence of thermal images is monitored to identify a continuously closed mouth of the respective subject for at least the predefined time threshold, as described herein. In response to the predefined time threshold being met, for each thermal image of the sequence, an upper region of the tongue is automatically identified, as described herein. A pattern (e.g., dataset) created from the estimated temperature of the upper region for each image of the sequence is analyzed identify a maximal value indicative of the estimated temperature of the upper region of the tongue of the pattern. The sequence of images is automatically labelled with the maximal value.

At 110, the estimated temperature of the upper region of the tongue and/or other tongue region(s) and/or non-tongue region(s) may be adjusted to estimate a core body temperature of the subject. The adjustment may be performed based on an adjustment function which may be based on one or more other parameters, for example, age, outdoor temperature, and the like.

At 112, the estimated temperature of the upper region of the tongue and/or other tongue region(s) and/or non-tongue region(s) (e.g., the adjusted temperature) is provided. For example, the estimated temperature is presented on a display, played as an audio message, stored in a data storage device, forwarded to a remote device, and/or provided to another process for additional processing.

Optionally, the estimated temperature of the upper region of the tongue and/or other tongue region(s) and/or non-tongue region(s) is compared to a threshold that separates between fever and no fever. Temperatures of the upper region of the tongue above the threshold indicative fever. Temperatures of the upper region of the tongue below the threshold indicative no fever. The presence of fever or no fever may be presented on a display, played as an audio message, stored in a data storage device, forwarded to a remote device, and/or provided to another process for additional processing.

At 114, instructions may be generated according to the estimated temperature and presence (or lack) of fever. The instructions may be for execution by a controller. For example, the instructions are for execution of a controller of a door for automatically opening a door of an enclosure to provide entry for the subject into the enclosure when the estimated temperature is below the threshold, and/or for automatically closing and/or locking the door to prevent entry of the subject into the enclosure when the estimated temperature is above the threshold. For example, passengers boarding a vehicle (e.g., plane, train, bus) and/or entering an office building are automatically imaged by a thermal sensor. People for whom the estimated temperature is below the threshold are automatically granted entrance to the vehicle and/or office building by an automated door. People for whom the estimated temperature is above the threshold are automatically prevented entrance to the vehicle and/or office building by the automated door.

In another example, the subject may be sitting in a vehicle (e.g., car). The thermal images (e.g., as in 102) depict the subject in the vehicle captured with a window of the vehicle open. In another example, where the car window is closed, the analysis may be performed for closed windows, for example, training classifiers on images of subjects in cars with closed windows. Instructions are generated for admitting the vehicle to a parking area and/or to let the vehicle keep on driving when the estimated temperature is below the threshold, optionally automatically activating a mechanism to open a gate and/or generating an indication for a user to manually open the gate. When the temperature is above the threshold, the gate may remain closed, denying the vehicle admission.

Optionally, as described herein, an alert and/or instructions may be generated when a cheating attempt (and/or other error) is detected.

Referring now back to FIG. 3, at 302, a sequence of non-thermal images captured by a non-thermal sensor simultaneously with the thermal sensor is received.

At 304, the sequence of non-thermal images is analyzed to identify one or more mouth parameters indicative of mouth disease, or to identify no mouth disease. Exemplary mouth parameters include tongue color and tongue shape. Exemplary mouth disease correlated with the mouth parameter(s) include Diabetes Mellitus type 2.

The mouth disease may be identified, for example, by segmentation code that identified the tongue, analysis code that identifies the mouth parameters by analyzing the shape and/or color of the tongue (e.g., using template matching, edge detection, and the like), and correlation code that correlate the mouth parameters with likelihood of mouth disease.

At 306, the estimated temperature computed from thermal images is obtained, for example, as described with reference to FIG. 1.

At 308, the estimated temperature of the upper region of the tongue obtained from the thermal images is adjusted according to the mouth parameter and/or mouth disease. The adjustment may be performed, for example, based on a correction function that correlates between mouth parameters and/or mouth disease and a correction amount to be applied to the estimated temperature obtained from thermal images.

In another exemplary implementation, the target thermal image(s) and/or non-thermal image(s) are inputted into a mouth disease classifier that generates the estimated temperature, optionally the corrected estimated temperature, as an outcome. The mouth disease classifier may be trained on a training dataset of thermal images captured by the thermal sensor and non-thermal images captured by the non-thermal sensor simultaneously with the thermal sensor, of subjects with their mouth open depicting the mouth parameter indicative of mouth disease and a ground truth label measurement indication of an actual core body temperature of the respective subject as measured by a thermometer, which corresponds to the corrected estimated temperature.

At 310, the corrected estimated temperature is provided. The corrected estimated temperature may be provided as described with reference to the estimated temperature of 112 of FIG. 1. Instructions may be generated as described with reference to 114 of FIG. 1.

Referring now back to FIG. 4, at 402, a sequence of non-thermal color images captured by a non-thermal color sensor simultaneously with the thermal sensor is received.

At 404, the sequence of thermal images captured by the thermal sensor simultaneously with the non-thermal color images is received.

At 406, the sequence of non-thermal color images is registered with the sequence of thermal images. Registration may be performed, for example, by identifying key anatomical landmarks on the face depicted in both sets of images (e.g., border of head, nose, eyes, ears, lips, mouth), and performing the registration according to the identified key anatomical landmarks. Anatomical landmarks may be mapped to one another, enabling finding a corresponding location in the thermal images once the location in the non-thermal color image is known.

At 408, the sequence of the non-thermal color images is analyzed to identify one or more non-thermal color target images depicting the upper region of the tongue of the subject. It may be easier and/or more accurate to find the upper region of the tongue in the non-thermal color image than in the thermal image.

The tongue with the upper region thereof, and/or the upper region alone, may be segmented according to color data of the respective image. For example, pixel values falling within a range indicative of color of the tongue and/or upper region of the tongue are segmented from the image. In another example, an edge detector differentiates between the tongue and surrounding regions based on differences in colors between the tongue and surrounding regions, and/or between the upper region of the tongue and the rest of the tongue and surrounding regions.

In other implementations, segmentation of the tongue and/or upper region of the tongue may be performed, for example, using a trained tongue segmentation classifier trained on a dataset of non-thermal colored images marked with an indication of the segmented tongue and/or segmented upper region of the tongue.

At 410, one or more thermal target images corresponding to the non-thermal color target image for which the tongue and/or upper region of the tongue is segmented, are identified. The upper region of the tongue in the thermal image(s) is registered to the segmented upper of the tongue of the non-thermal color image(s).

Since the thermal images are registered with the non-thermal images, once the upper region of the tongue is found in the color non-thermal images, the upper region of the tongue may be found in the thermal images based on the registration mapping.

At 412, the temperature of the upper region of the tongue is estimated based on the thermal image, for example, as described herein. The temperature of the upper region of the tongue may be provided as input into feature 110 described with reference to FIG. 1.

Optionally, at 414, one or more of the non-thermal images of the subject may be analyzed to compute an estimated age of the subject. The analysis to estimate the age may be performed, for example, by a trained classifier trained on a training dataset that includes images of different subjects labelled with respective ages, and/or other code that analyzes certain facial features and computes the estimated age, for example, presence of wrinkles, percentage of grey hairs in comparison to hairs of other colors, and the like.

At 416, the estimated temperature of the upper region of the tongue is adjusted according to a correlation between age and tongue temperature. There may be a small negative correlation between tongue temperature and age. The estimated temperature of the upper region of the tongue may be adjusted based on the correlation, to provide a normalized temperature which may be compared to a standard baseline to determine presence of fever. Alternatively, the threshold used to differentiate a temperature indicative of fever versus non-fever may be selected based on the age of the subject depicted in the image.

The adjusted temperature of the upper region of the tongue, and/or the selected threshold for differentiating fever versus non-fever may be provided as input into feature 110 described with reference to FIG. 1.

Referring now back to FIG. 5, at 502, instructions indicating to the subject to open their mouth may be executed by a user interface, for example, an audio message is played over speakers, written text is presented on a display (e.g., within a GUI), and/or an instruction video is presented on a display (e.g., within the GUI).

The user may be instructed to make a sound when their mouth is open, for example, say AHHH.

Alternatively or additionally, the instructions to the subject are to keep their mouth closed for at least the predefined length of time (e.g., as described herein) and then to open their mouth. The user interface (e.g., GUI) may present a countdown of how much time remains for the user to remain with their mouth closed. Once the time has elapsed, the user interface may present the instructions to open the mouth.

At 504, in response to the execution of the instructions by the user interface indicating to the user to open their mouth, the sequence of thermal images of the subject are captured by the thermal sensor.

Alternatively, in response to the execution of the instructions by the user interface indicating to the user to close their mouth, the sequence of thermal images of the subject are captured by the thermal sensor. The thermal image may be used to monitor that the subject is keeping their mouth closed, as described herein.

At 506, acoustic signals may be captured by an acoustic sensor (e.g., microphone) simultaneously with the thermal sensor. The acoustic signals are time registered with the sequence of the thermal images. For example, portions of the acoustic signals are time stamped, and each of the thermal images is time stamped. In another example, a mapping dataset (e.g., pointers, table) maps between thermal images and portions of the acoustic signal that are simultaneously captured.

At 508, the acoustic signals are analyzed to identify an indication of open mouth of the subject, for example, by detecting the sound that the user has been instructed to say when their mouth is open, for example, AHHHH.

At 510, target thermal image(s) are identified as thermal images that correspond to the time registered portion of the acoustic signals indicative of the open mouth of the subject.

At 512, the estimated temperature of the upper portion of the tongue is measured from the target thermal images, for example, as described with reference to FIG. 1 and/or other methods described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant thermal images will be developed and the scope of the term thermal image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of measuring a temperature of a subject, comprising:
    receiving a sequence of a plurality of thermal images of a subject captured by a thermal sensor;
    receiving a sequence of a plurality of non-thermal color images captured by a non-thermal color sensor simultaneously with the thermal sensor;
    registering the sequence of the plurality of non-thermal color images with the sequence of the plurality of thermal images;
    analyzing the sequence of the plurality of thermal images to identify at least one target thermal image depicting an upper region of a tongue of the subject;
    analyzing the sequence of the plurality of non-thermal color images to identify at least one non-thermal color target image depicting the upper region of the tongue of the subject segmented according to color data of the respective image;
    analyzing the at least one target thermal image to identify an estimated temperature of the upper region of the tongue; and
    providing the estimated temperature of the upper region of the tongue;
    wherein the at least one thermal target image corresponds to the at least one non-thermal color target image, and
    wherein the upper region of the tongue in the at least one thermal image is registered to the segmented upper of the tongue of the at least one non-thermal color image.

2. The method of claim 1, wherein the at least one target thermal image comprises a sequence of a plurality of target thermal images depicting the upper region of the tongue,
    wherein analyzing the at least one target thermal image comprises analyzing a pattern of the estimated temperature of the upper region of the tongue in each of the plurality of target thermal images to identify a maximal value of the estimated temperature of the upper region of the tongue of the pattern,
    wherein providing the estimated temperature of the upper region of the tongue comprises providing the maximal value of the estimated temperature of the upper region of the tongue.

3. The method of claim 1, wherein analyzing the sequence comprises:
    analyzing the sequence to identify the at least one thermal image according to a maximal opening of a mouth.

4. The method of claim 3, further comprising:
    analyzing at least one image of the sequence to identify a location of the mouth of the subject in the respective image;
    analyzing the at least one image to identify the mouth of the subject in an open state at the identified location.

5. The method of claim 3, wherein analyzing the at least one target thermal image comprises:

analyzing the at least one target thermal image depicting maximal opening of the mouth to identify a plurality of tongue regions and/or a plurality of non-tongue regions;

analyzing the at least one target thermal image to identify an estimated temperature of the plurality of tongue regions including the upper region of the tongue and/or the plurality of non-tongue regions; and providing the estimated temperature of at least one of the plurality of tongue regions including the upper region of the tongue and/or the plurality of non-tongue regions.

6. The method of claim 5, further comprising:
analyzing a temperature distribution and/or an aggregated temperature of the estimated temperature of at least one of the plurality of tongue regions including the upper region of the tongue and/or the plurality of non-tongue regions to identify an indication of a cheating attempt to artificially lower or raise the temperature.

7. A computer implemented method of measuring a temperature of a subject, comprising:
receiving a sequence of a plurality of thermal images of a subject captured by a thermal sensor;
analyzing the sequence of the plurality of thermal images to identify at least one target thermal image depicting an upper region of a tongue of the subject;
analyzing the at least one target thermal image to identify an estimated temperature of the upper region of the tongue;
receiving a sequence of a plurality of non-thermal images captured by a non-thermal sensor simultaneously with the thermal sensor;
analyzing the sequence of the plurality of non-thermal images to identify at least one mouth parameter indicative of mouth disease, or identify no mouth disease; and
in response to identifying no mouth disease, providing the estimated temperature of the upper region of the tongue.

8. The method of claim 7, in response to identifying mouth diseases, further comprising correcting the estimated temperature of the upper region of the tongue according to the at least one mouth parameter.

9. The method of claim 7, in response to identifying mouth diseases, further comprising inputting the at least one target thermal image and at least one non-thermal image into a mouth disease classifier trained on a training dataset of a plurality of target thermal images and a plurality of non-thermal images of a plurality of subjects depicting the at least one mouth parameter indicative of mouth disease captured by the thermal sensor and the non-thermal sensor and a ground truth label measurement indication of a core body temperature of the respective subject, wherein providing comprises providing the outcome of the mouth disease classifier.

10. The method of claim 1, further comprising:
executing by a user interface, instructions indicating to the subject to open the mouth of the subject; and
in response to the execution of the instructions, receiving the sequence of the plurality of thermal images of the subject captured by the thermal sensor.

11. The method of claim 1, further comprising:
receiving acoustic signals captured by an acoustic sensor simultaneously with the thermal sensor, wherein the acoustic signals are time registered with the sequence of the plurality of thermal images;
analyzing the acoustic signals to identify an indication of the open mouth of the subject, wherein analyzing the sequence of the plurality of thermal images to identify at least one target thermal image comprises the at least one target thermal image corresponds to the time registered portion of the acoustic signals indicative of the open mouth of the subject.

12. The method of claim 1, further comprising:
receiving at least one non-thermal image of the subject captured by a non-thermal sensor;
analyzing the at least one non-thermal image of the subject to compute an estimated age of the subject; and
adjusting the estimated temperature of the upper region of the tongue according to a correlation between age and tongue temperature.

13. The method of claim 1, further comprising generating instructions for automatically opening a door of an enclosure to provide entry for the subject into the enclosure when the estimated temperature is below a threshold.

14. The method of claim 1, wherein the subject is in a vehicle, and the sequence of the plurality of thermal images depicts the subject in the vehicle captured with a window of the vehicle open.

15. The method of claim 14, further comprising generating instructions for admitting the vehicle to a parking area when the estimated temperature is below a threshold.

16. The method of claim 1, wherein the thermal sensor is a non-contact sensor located remotely from the subject and not in contact with the subject during acquisition of the sequence of the plurality of thermal images.

17. The method of claim 1, wherein the estimated temperature of the upper region of the tongue is adjusted to estimate a core body temperature of the subject.

18. The method of claim 1, further comprising
monitoring the sequence of the plurality of thermal images to identify a continuously closed mouth of the subject for at least a predefined time threshold; and
in response to the predefined time threshold being met, analyzing the at least one target thermal image to identify the estimated temperature of the upper region of the tongue.

19. A computer implemented method of measuring a temperature of a subject, comprising:
receiving a sequence of a plurality of thermal images of a subject captured by a thermal sensor;
analyzing the sequence of the plurality of thermal images to identify at least one target thermal image depicting an upper region of a tongue of the subject;
analyzing the at least one target thermal image to identify an estimated temperature of the upper region of the tongue; and
providing the estimated temperature of the upper region of the tongue;
wherein the analyzing the sequence of the plurality of thermal images and the analyzing the at least one target thermal image comprises inputting the sequence of the plurality of thermal images into temperature classifier,
wherein the estimated temperature of the upper region of the tongue is an outcome of the temperature classifier,
wherein the classifier is trained on a training dataset including, for each of a plurality of subjects, the sequence of thermal images, and a ground truth label of the estimated temperature of the upper region of the tongue of the respective subject,
wherein for each subject, the ground truth label is automatically assigned to the sequence of thermal images of the respective subject by:

monitoring the sequence of the plurality of thermal images to identify a continuously closed mouth of the respective subject for at least a predefined time threshold; and in response to the predefined time threshold being met, identifying, for each thermal image of the sequence, an upper region of the tongue;

analyzing a pattern of the estimated temperature of the upper region for the sequence to identify a maximal value of the estimated temperature of the upper region of the tongue of the pattern, automatically labelling the sequence with the maximal value.

20. A system for measuring a temperature of a subject, comprising:

at least one hardware processor executing a code for:
receiving a sequence of a plurality of thermal images of a subject captured by a thermal sensor;
receiving a sequence of a plurality of non-thermal color images captured by a non-thermal color sensor simultaneously with the thermal sensor;
registering the sequence of the plurality of non-thermal color images with the sequence of the plurality of thermal images;
analyzing the sequence of the plurality of thermal images to identify at least one target thermal image depicting an upper region of a tongue of the subject;
analyzing the sequence of the plurality of non-thermal color images to identify at least one non-thermal color target image depicting the upper region of the tongue of the subject segmented according to color data of the respective image;
analyzing the at least one target thermal image to identify an estimated temperature of the upper region of the tongue; and
providing the estimated temperature of the upper region of the tongue;
wherein the at least one thermal target image corresponds to the at least one non-thermal color target image, and
wherein the upper region of the tongue in the at least one thermal image is registered to the segmented upper of the tongue of the at least one non-thermal color image.

21. A computer program product for measuring a temperature of a subject, comprising:

a non-transitory memory having stored thereon a code for executing by at least one hardware processor, comprising instructions for:
receiving a sequence of a plurality of thermal images of a subject captured by a thermal sensor;
receiving a sequence of a plurality of non-thermal color images captured by a non-thermal color sensor simultaneously with the thermal sensor;
registering the sequence of the plurality of non-thermal color images with the sequence of the plurality of thermal images;
analyzing the sequence of the plurality of thermal images to identify at least one target thermal image depicting an upper region of a tongue of the subject;
analyzing the sequence of the plurality of non-thermal color images to identify at least one non-thermal color target image depicting the upper region of the tongue of the subject segmented according to color data of the respective image;
analyzing the at least one target thermal image to identify an estimated temperature of the upper region of the tongue; and
providing the estimated temperature of the upper region of the tongue;
wherein the at least one thermal target image corresponds to the at least one non-thermal color target image, and
wherein the upper region of the tongue in the at least one thermal image is registered to the segmented upper of the tongue of the at least one non-thermal color image.

* * * * *